(12) United States Patent
Chuang et al.

(10) Patent No.: US 7,315,931 B2
(45) Date of Patent: Jan. 1, 2008

(54) METHOD FOR MANAGING AN EXTERNAL MEMORY OF A MICROPROCESSOR

(75) Inventors: Cheng-Te Chuang, Hsin-Chu (TW); Yuan-Ting Wu, Hsin-Chu (TW); Li-Chun Tu, Taipei (TW)

(73) Assignee: MediaTek, Inc., Hsin-Chu Hsien (TW)

( * ) Notice: Subject to any disclaimer, the term of this patent is extended or adjusted under 35 U.S.C. 154(b) by 265 days.

(21) Appl. No.: 10/605,165

(22) Filed: Sep. 12, 2003

(65) Prior Publication Data
US 2004/0172515 A1    Sep. 2, 2004

(30) Foreign Application Priority Data
Feb. 27, 2003    (TW) ............................. 92104326 A

(51) Int. Cl.
*G06F 12/00*    (2006.01)
(52) U.S. Cl. ................ 711/202; 711/203; 711/154; 711/2; 711/220
(58) Field of Classification Search ............ 711/202, 711/203, 154, 220, 2
See application file for complete search history.

(56) References Cited

U.S. PATENT DOCUMENTS 5,146,581 A * 9/1992 Kaneko ................ 711/5
6,564,283 B1 * 5/2003 Ahn .................... 711/2
2004/0199693 A1 * 10/2004 Tseng et al. .......... 710/260

FOREIGN PATENT DOCUMENTS

JP    05046473    * 5/1993

OTHER PUBLICATIONS

Shu Shen Dang; "Migrating from the MCS® 51 Microcontroller to the MCS 251 Microcontroller (8XC251SB)—Software and hardware considerations".

* cited by examiner

*Primary Examiner*—Kimberly McLean-Mayo
(74) *Attorney, Agent, or Firm*—Winston Hsu

(57) ABSTRACT

A method for managing an external memory of a microprocessor so that the external memory only contains one copy of a common area. By providing an address translator, mapping the page and the address of the common area of the page pointed by a microprocessor to the physical address of the common area of the external memory, using the address translator to translate a page and an address pointed by a microprocessor to a physical address of the external memory, and using the microprocessor to access data stored at the physical address of the external memory; the memory can be more efficiently used.

14 Claims, 6 Drawing Sheets

METHOD FOR MANAGING AN EXTERNAL MEMORY OF A MICROPROCESSOR

BACKGROUND OF INVENTION

1. Field of the Invention

The invention relates to a method for managing a memory and more particularly, to a method for managing an external memory of a microprocessor.

2. Description of the Prior Art

Intel Corporation generally refers to a microprocessor as an MCS (Micro Computer System) and the MCS-31/32/51/52 series microprocessor developed by the Intel Corporation is commonly used in industry. Generally speaking, the MCS-31/32/51/52 series devices are 8-bit microprocessors equipped with memory and I/O ports. Take the MCS-51 microprocessor for example; it has a program memory of 4K bytes, a data memory of 128 bytes, and 32 I/O ports. Similarly the MCS-52 series microprocessor has a program memory of 8K bytes, a data memory of 256 bytes, and also 32 I/O ports. The program memory is a read-only memory (ROM) for storing programs written by a user, whereas the data memory is a random-access memory for storing data accessed by the microprocessor while it is executing the programs. The capacity of the program memory and data memory of the MCS-31/32/51/52 series microprocessors can both be externally expanded to 64K bytes, if external memory devices are employed.

For an MCS microprocessor user, an external memory with capacity of 64K bytes will not be large enough if his software has more than 64K bytes of program or data. To solve this problem, the capacity of the external memory of the microprocessor can be substantially expanded by switching a plurality of memory banks, or pages, when the user uses the extra pins of the microprocessor as decode lines to set an address for an external memory with capacity of over 64K bytes. If the external memory is one memory device with large capacity, the extra pins of the microprocessor can be address lines. If there are several external memory devices with smaller capacity, the extra pins of the microprocessor can be used to select the memory chips. Because the largest capacity of the external memory of the MCS microprocessor is 64K bytes, 64k bytes can be taken as a unit (a page) when the microprocessor switches the memory banks. As a result, the microprocessor is able to access several pages of external memory in which the programmer can store segments of his program codes. However only one page of memory is visible to the microcontroller at any moment, so the software program needs to set the state of the bank-selecting pins properly before a different page of memory can be accessed.

Further, an interrupt vector table of the MCS microprocessor is stored at a specific address of the external memory. The interrupt vector table usually comprises interrupt vectors that direct the program execution flow to the interrupt service routines. When an interrupt occurs, the microprocessor immediately fetches instructions of the corresponding interrupt vector at the specific address in the current page. Because the microprocessor does not switch memory banks when an interrupt occurs, an error will come up if the microprocessor cannot find the interrupt vector table in the current page. To solve this problem, a common area in each memory bank can be reserved for storing the interrupt vector table. The content of the common area is made identical for all memory banks, thus the microprocessor can find the interrupt vector table in whatever page the interrupt occurs. Furthermore, besides the interrupt vector table, interrupt service routines, general functions, and data for correctly switching memory banks are usually stored in the common area as well, so that they are accessible in all memory pages. For simplicity of explanation, all the program codes and data stored in the common area will be referred to as "common data" hereafter in this document.

FIG. 1 is a diagram showing the interconnections between an MCS-51/52/31/32 microprocessor and an external memory 12 according to the prior art. The capacity of the external memory 12 of the MCS-51/52 series microprocessor is expanded to 512K bytes by switching the eight 64K-byte memory banks. The external memory 12 has 18 address lines labeled A18-A0, of which A18 is the most-significant bit (MSB) and A0 is the least-significant bit (LSB). The eight LSBs (A7-0) of the memory 12 are driven by the latch 5, which holds the state of the MCS microprocessor's lower address bus AD7-0 during memory accesses. The AD7-0 bus 4 also serves as the data bus between the MCS microprocessor 1 and the external memory 12 on a time-multiplexed basis. The address bus 3 delivers MCS microprocessor address A15-8 to the external memory 12. Three extra pins, P1.0, P1.1 and P1.2 of the MCS microprocessor 1 are connected to address pins A18, A17 and A16 respectively. Therefore the MCS microprocessor can access a one-eighth portion of the external memory 12 by setting the proper state of the P1.0, P1.1 and P1.2 pins.

By dividing the external memory 12 into eight 64K-byte portions, or pages, which are switchable by pins P1.0, P1.1 and P1.2, the MCS microprocessor 1 is granted full access to the 512K-byte external memory 12. FIG. 2 shows the organization of the external memory 12 as is visible to the MCS microprocessor 1. While the capacity of each page is 64K bytes, a common area in each page with certain capacity (e.g. 10K bytes) must be reserved for storing the interrupt vector table, interrupt service routines, general functions and other data. Because the common area data is duplicated at the same relative location in each page, the MCS microprocessor 1 is able to access the common data regardless of the state of pins P1.0-2. For example, assuming that the processor has to execute a program in page 2 in response to an interrupt while executing a program in page 1, it may first execute a memory page switching routine residing in the common area. The routine sets the P1.0-2 pin state for page 2, then transfers the program flow to the target program in page 2. After executing the program in the page 2, the processor may return to page switching program in the common area, change the page select pin state back to page 1, and then the processor can return to the address of the program in page 1 to continue executing the program.

According to the foregoing description, though the largest capacity of the external memory of the MCS-51/52 series microprocessor is 64K bytes, the external memory can be further expanded by switching the plurality of memory banks when using the extra pins of the microprocessor as the decode lines to set the address of the external memory with capacity of over 64K bytes. However, each memory bank has to reserve a certain space for the common area storing common data. As a result, multiples sets of common area are allocated in the external memory, as shown in FIG. 3, so the space of the external memory can not be utilized efficiently.

SUMMARY OF INVENTION

It is therefore a primary objective of the claimed invention to provide a method for managing an external memory of a microprocessor to solve the above-mentioned problem.

According to the claimed invention, the method for managing the external memory of the microprocessor comprises (a) providing an address translator, (b) using the address translator to translate a page of the external memory and an address of the page provided by the microprocessor to a physical address of the external memory, and (c) using the microprocessor to access data stored at the physical address of the external memory. The method further comprises recording a common area onto the external memory and mapping the page of the external memory and the address of the common area of the page provided by the microprocessor to the physical address of the common area of the external memory.

These and other objectives of the present invention will no doubt obvious to those of ordinary skill in the art after reading the following detailed description of the preferred embodiment that is illustrated in the various figures and drawings.

DETAILED DESCRIPTION

Figure 1:
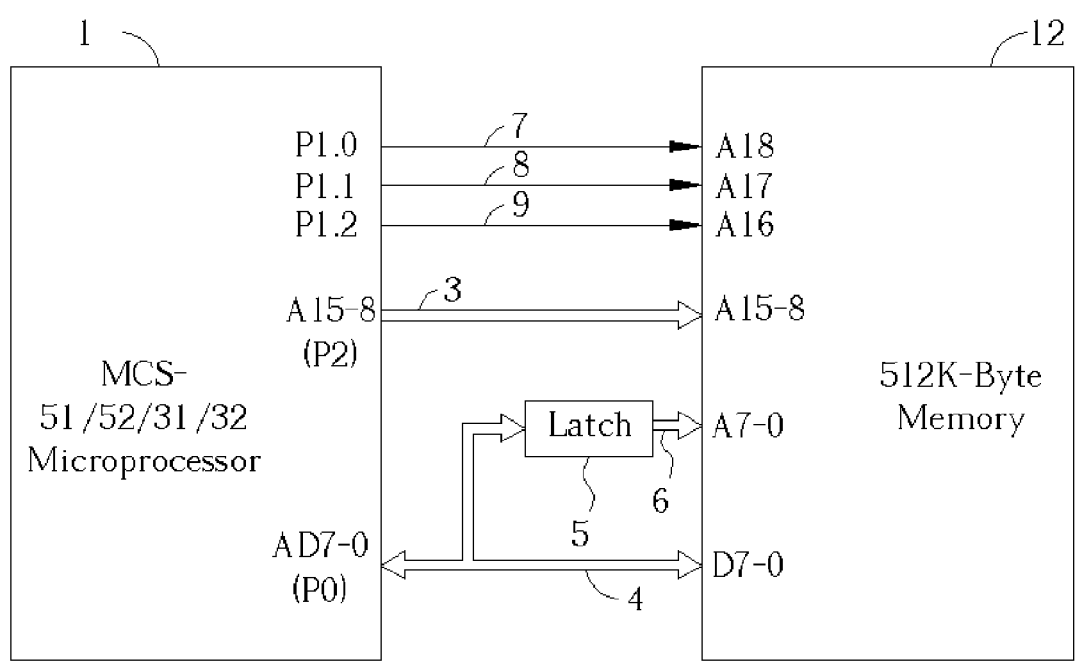
FIG. 1 is a diagram of the connection between an MCS microprocessor and an external memory according to the prior art.
Figure 2:
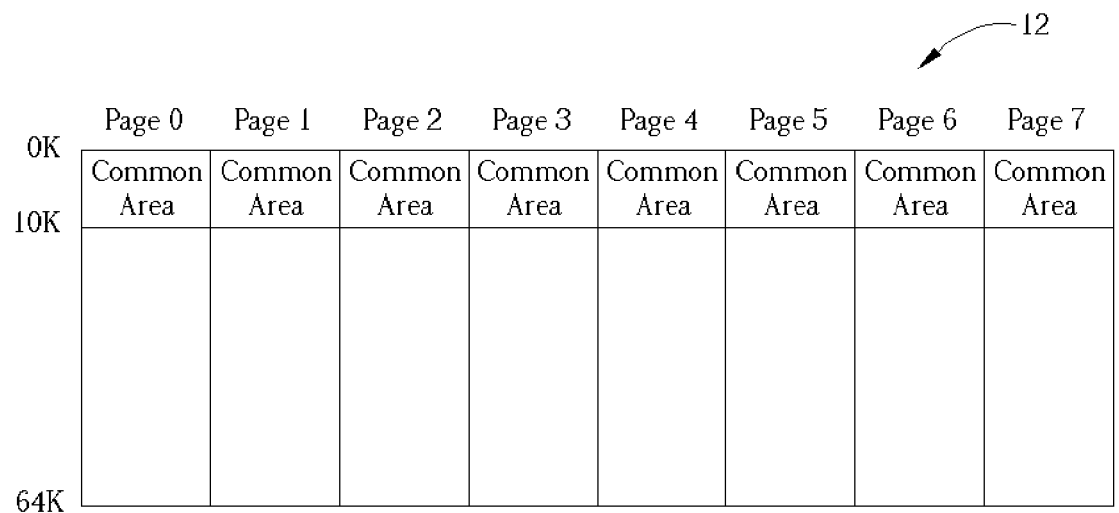
FIG. 2 shows the organization of the external memory that is divided into pages according to the prior art.
Figure 3:
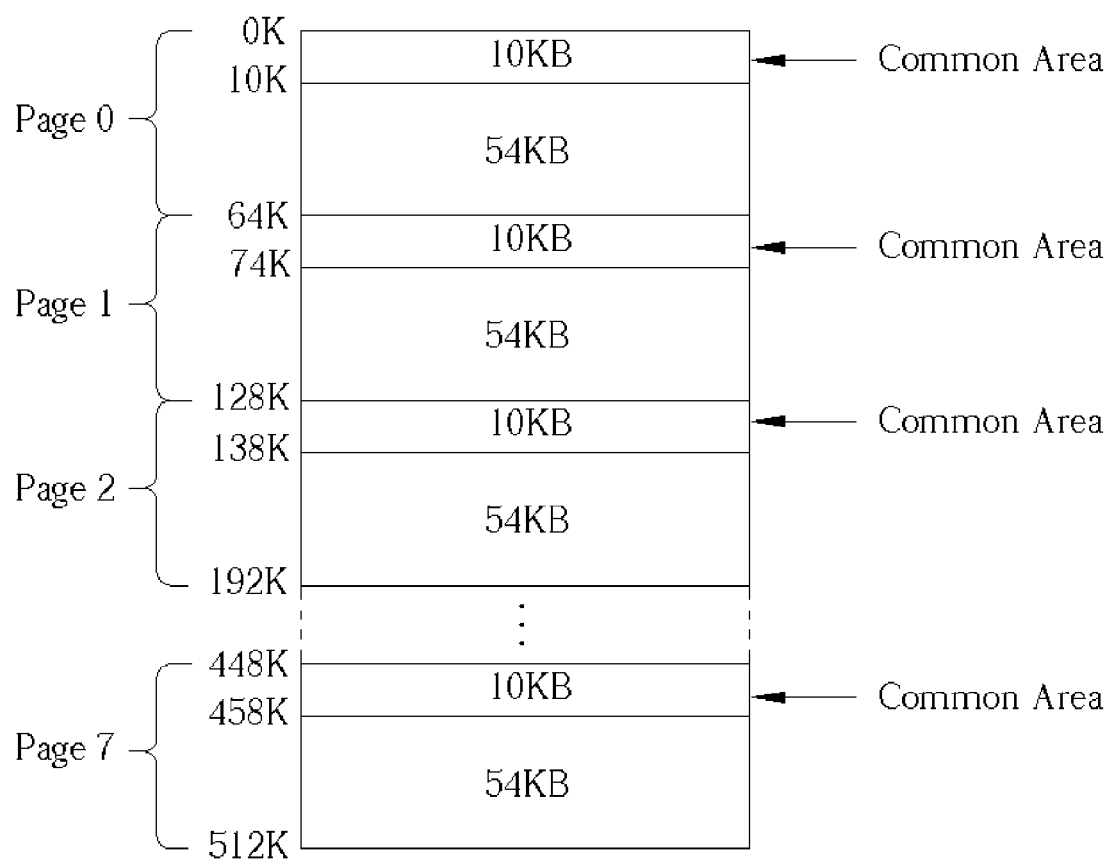
FIG. 3 illustrates the address mapping of the external memory according to the prior art.
Figure 4:
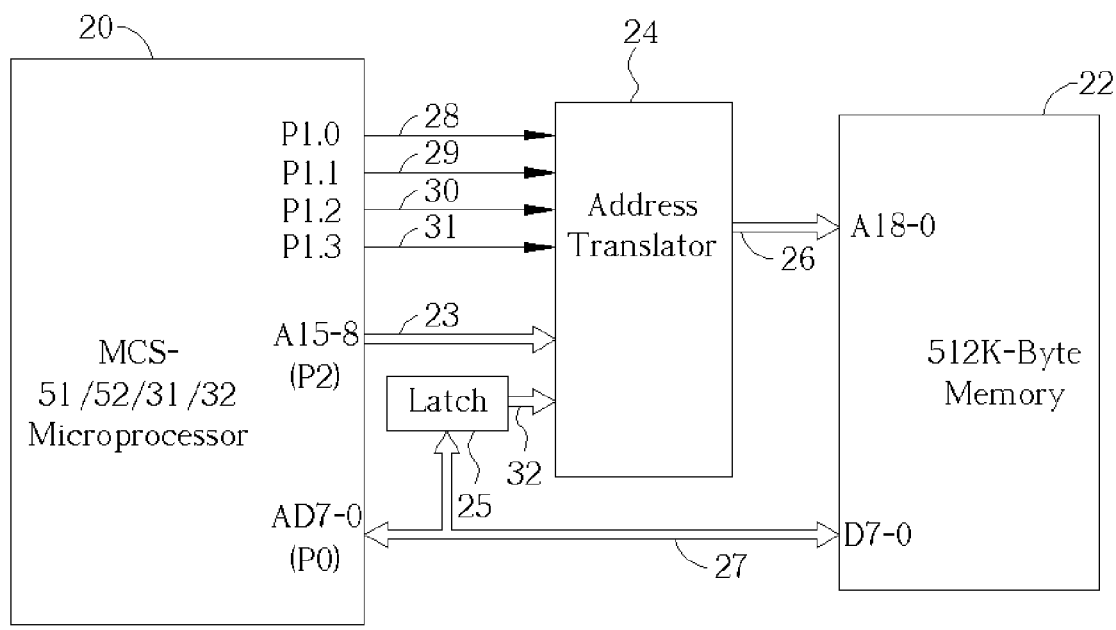
FIG. 4 is a diagram of a microprocessor connected with an external memory according to the present invention.

FIG. 4 is a diagram of a microprocessor 21 connected with an external memory 22 according to the present invention. The microprocessor 21 of the present invention is provided with an address translator 24 for mapping an address of a common area in each memory bank to one common area. Therefore, the full space in each memory bank; which in the prior art part was used to store common data; can be used for storing other data. For example, according to the prior art, the space of the 512K-byte external memory in FIG. 1 can be divided into 8 memory banks that can accommodate 10+54×8=442K bytes of data. However, according to the present invention, the space of the external memory 22 in FIG. 4 can be divided into 9 memory banks or even more than 9 memory banks by means of the address translator 24. The inputs to the address translator 24 include the four bank selection pins P1.0 28, P1.1 29, P1.2 30 and P1.3 31, which specify the page index N, and address bus 23 and 32, which specify the address A to be accessed within page N. The output of the address translator 24 is 18-bit address bus 26, which specifies the physical address P within the external memory. For ease of explanation, the state of N and A is hereafter collectively referred to as the "logical address" of the MCS microprocessor. Bus AD7-0 27 is for reading data from the external memory 22. Comparing to the prior art in FIG. 1, because the number of addressable memory banks increases via the address translator 24, the microprocessor 20 in FIG. 4 needs more bank selection pins in order to specify the increased memory banks.

Figure 5:
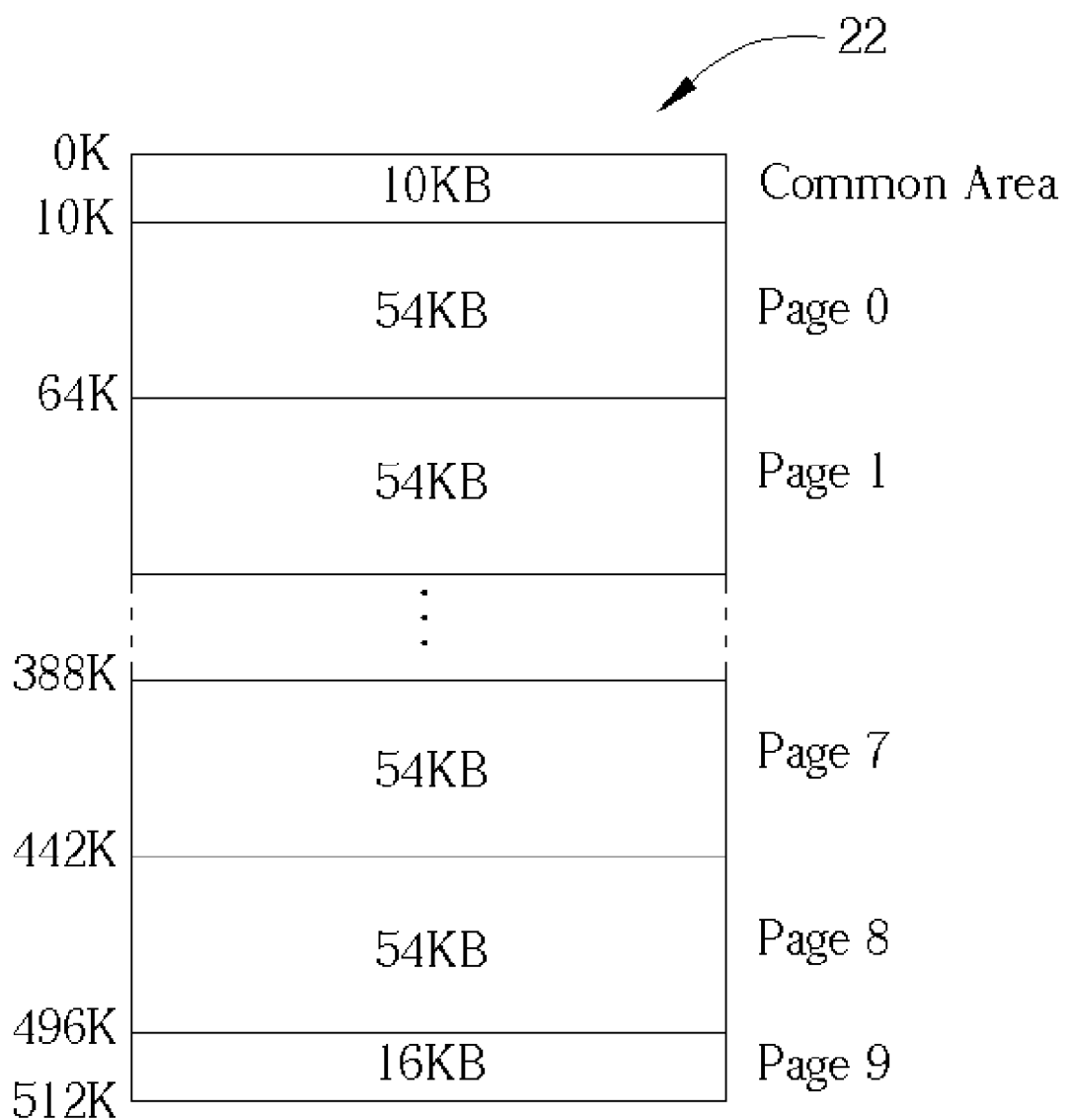
FIG. 5 illustrates the address mapping of the external memory of FIG. 4.

FIG. 5 is a diagram of the external memory 22 according to the present invention. For illustration purpose, in FIG. 5 the common area is placed at the lowest address (address 0) of the external memory 22. Whenever the MCS microprocessor accesses an address belonging to the common area in a memory bank, the address translator 24 maps the logical address to the corresponding physical address inside the common area of the external memory. On the other hand, whenever the MCS microprocessor accesses an address not belonging to the common area, the address translator converts the logical address to the physical address inside the non-common area of the external memory. Specifically, suppose the size of the common area is 10K (10240) bytes, the logical address to physical address conversion by address translator 24 is P=A if (A<10240); P=10240+N× 55296 if (A≧10240); where P is the translated physical address to the external memory, and N and A are the logical page index and address of the data that is being accessed by the MCS microprocessor. Moreover, the figure 55296 is the non-common area size of each page (54K in FIG. 5) and 10240 is the size of the common area in a page. For example, when the microprocessor accesses the logical address 0x12AB, which is inside the common area, the address translator 24 converts it to the physical address 0x12AB of the external memory 22. If the microprocessor accesses the logical address 0xA100 of page 3, the physical address will be 0x32900 (0xA100+3×55296=0x32900) according to the aforementioned formula.

Figure 6:
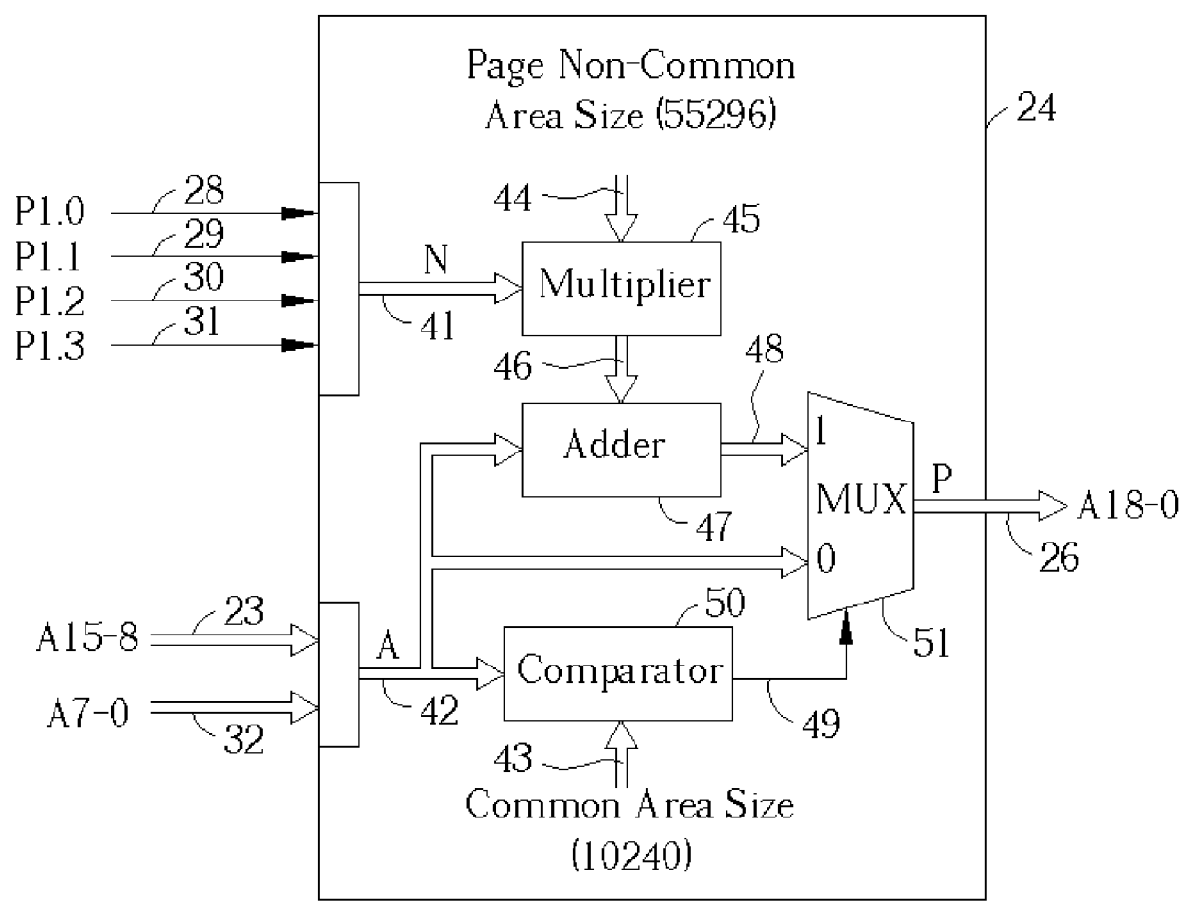
FIG. 6 shows a circuit implementing the address conversion function of the present invention.

The address conversion of the address translator 24 can be implemented by the circuit in FIG. 6. In FIG. 6, the page selecting pins P1.0 28, P1.1 29, P1.2 30 and P1.3 31 are grouped into the 4-bit page index bus 41, whose state is denoted N. The logical address buses A15-8 32 and A7-0 32 are grouped into the 16-bit logical address bus 42, whose state is denoted A. At the multiplier 45, the page index bus 41 is multiplied by 55296, which is the size of the non-common area in a page, to generate the value 55296×N on bus 46. The adder 47 sums the values of bus 42 and bus 46, producing on bus 48 the value of 55296×N+A, which is the physical address for non-common data.

To determine whether a logical address is for the common data or not, the comparator 50 compares A with the common area size (10240), and changes the state of the wire 49 according to the comparison result. If A is less than the common area size, the wire 49 will be driven low (logical zero) so that the multiplexer 51 selects A to the output bus 26 of the address translator 24. Otherwise, the wire 49 will be set high (logical one) so that the value (55296×N+A) presented on bus 48 is selected by multiplexer 48 as the output 26.

As a different embodiment, the content of the common area size bus 43 can be provided by programmable registers rather than being fixed at a constant value (e.g. 10240). And the content of the non-common area size per page bus 44 can be calculated by 65536—(common area size). Such a circuit arrangement will allow the logical-to-physical address translation to be adjusted for whatever size of the common area, thus increases the memory management flexibility.

For a common area of 10K bytes, according to the prior art 70K bytes of the 512K-byte external memory will be wasted because the 10K-byte common data is duplicated eight times. However, according to the present invention, the external memory 22 is stored with only one copy of the common data, thus the external memory 22 can be divided into 10 pages, as shown in FIG. 5. Comparing to the prior art, the extra page 8 and page 9 having 54K bytes and 16K bytes of non-common space respectively are made available by the address translator 24. They can be used to store more program codes and data as need be. The increase of memory pages indicates the higher memory usage efficiency achieved by the address translator. The larger the common area is, the more space is saved by the present invention.

According to the foregoing description, the address translator 24 can translate the logical address comprising a page index and an in-page address provided by the microprocessor 20, to the physical address of the external memory 22. In the translation process the common areas of all pages are mapped onto a single physical region of the external memory, eliminating any redundant common data existing in the prior art. Meanwhile, address spaces outside the common areas of memory pages are mapped to non-overlapping physical regions of the external memory. Therefore, through the address translator 24 the microprocessor 20 can efficiently use the space of the external memory 22 to expand its accessible memory capacity.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A memory accessing system for achieving increased memory capacity of a microprocessor, the memory accessing system comprising:
    an external memory including a single physical region; and
    an address translator coupled between the microprocessor and the external memory for translating a page and an address within the page pointed to by the microprocessor when accessing the external memory into a physical address of the external memory, and for mapping a predetermined range of addresses within all pages pointed to by the microprocessor when accessing the external memory into the single physical region of the external memory.

2. The memory accessing system of 1, wherein the predetermined range of addresses within all pages is relatively the same range of addresses within all pages.

3. The memory accessing system of claim 1, wherein the address translator is further for mapping addresses outside the predetermined range of addresses within all pages to areas of the external memory not within the single physical region.

4. The memory accessing system of claim 1, wherein the external memory further includes a plurality of non-common areas, each page to which the microprocessor can point when accessing the external memory having a corresponding non-common area within the external memory.

5. The memory accessing system of claim 4, wherein the address translator is further for mapping addresses outside the predetermined range of addresses for each page to a physical address of the external memory being within a non-common area corresponding to the page being pointed to by the microprocessor.

6. The memory accessing system of claim of 1, wherein the address translator comprises:
    a multiplier coupled to page select lines of the multiprocessor for multiplying a page number pointed to by the multiprocessor when accessing the external memory by a non-common area size to thereby generate an offset value;
    a comparator coupled to address lines of the multiprocessor for comparing an address within the page pointed to by the multiprocessor when accessing the external memory with a size of the single physical region to thereby generate a select signal, the select signal being asserted if the address within the page pointed to by the multiprocessor is less than the size of the single physical region;
    an adder coupled to address lines of the multiprocessor and the multiplier for adding the address within the page pointed to by the multiprocessor and the offset value to thereby generate a non-common data physical address value; and
    a multiplexer coupled to the address lines of the multiprocessor, the adder, and the comparator for outputting the physical address of the external memory as the non-common data physical address value when the select signal is not asserted, and for outputting the physical address of the external memory as the address within the page pointed to by the multiprocessor when the select signal is asserted.

7. The memory accessing system of claim of 6, further comprising a programmable register for storing the size of the single physical region.

8. A method of memory access for achieving increased memory capacity of a microprocessor, the method comprising:
    providing an external memory including a single physical region;
    translating a page and an address within the page pointed to by the microprocessor when accessing the external memory into a physical address of the external memory; and
    mapping a predetermined range of addresses within all pages pointed to by the microprocessor when accessing the external memory into the single physical region of the external memory.

9. The method of 8, wherein the predetermined range of addresses within all pages is relatively the same range of addresses within all pages.

10. The method of claim 8, further comprising mapping addresses outside the predetermined range of addresses within all pages to areas of the external memory not within the single physical region.

11. The method of claim 8, wherein the external memory further includes a plurality of non-common areas, each page to which the microprocessor can point when accessing the external memory having a corresponding non-common area within the external memory.

12. The method of claim 8, further comprising mapping addresses outside the predetermined range of addresses for each page to a physical address of the external memory being within a non-common area corresponding to the page being pointed to by the microprocessor.

13. The method of claim of 8, further comprising:
    multiplying a page number pointed to by the multiprocessor when accessing the external memory by a non-common area size to thereby generate an offset value;
    comparing an address within the page pointed to by the multiprocessor when accessing the external memory with a size of the single physical region to thereby generate a select signal, the select signal being asserted if the address within the page pointed to by the multiprocessor is less than the size of the single physical region;

adding the address within the page pointed to by the multiprocessor and the offset value to thereby generate a non-common data physical address value; and outputting the non-common data physical address value as the physical address of the external memory when the select signal is not asserted, and outputting the address within the page pointed to by the multiprocessor as the physical address of the external memory when the select signal is asserted.

14. The method of claim of 13, further comprising storing the size of the single physical region in a programmable register.

* * * * *